United States Patent [19]
Killian

[11] Patent Number: 4,719,939
[45] Date of Patent: Jan. 19, 1988

[54] APPARATUS FOR COUPLING A VALVE AND ROTARY ACTUATOR

[75] Inventor: Henry R. Killian, Monroe, N.C.

[73] Assignee: Conbraco Industries, Inc., Matthews, N.C.

[21] Appl. No.: 60,662

[22] Filed: Jun. 10, 1987

[51] Int. Cl.[4] .................... F16K 43/00; F16K 31/124
[52] U.S. Cl. .................... 137/315; 251/58; 251/229; 251/292
[58] Field of Search ............... 137/315, 343; 248/674; 251/58, 229, 250, 304, 306, 308, 315, 291, 292

[56] References Cited

U.S. PATENT DOCUMENTS

| | | | |
|---|---|---|---|
| 3,107,080 | 10/1963 | Priese | 251/58 |
| 3,460,799 | 8/1969 | Sanctuary | 251/58 |
| 3,650,506 | 3/1972 | Bruton | 251/58 |
| 4,087,074 | 5/1978 | Massey et al. | 251/58 |
| 4,260,128 | 4/1981 | Tito | 251/58 |
| 4,270,849 | 6/1981 | Kalbfleisch | 251/292 |
| 4,313,595 | 2/1982 | Markley | 251/292 |
| 4,633,897 | 1/1987 | Effenberger | 251/58 |
| 4,647,003 | 3/1987 | Hilpert et al. | 251/58 |

Primary Examiner—George L. Walton
Attorney, Agent, or Firm—Shefte, Pinckney & Sawyer

[57] ABSTRACT

Apparatus for close positive coupling of an actuator to a ball valve utilizes a bracket plate assembly fixing the valve and actuator bodies together and supporting the hexagonal alignment bushing in fitted engagement with the valve stem gland screw to apply reactive loads generated by valve actuation forces to the gland screw rather than the valve stem, whereby essentially only torsional actuation forces are applied to the valve stem.

6 Claims, 3 Drawing Figures

APPARATUS FOR COUPLING A VALVE AND ROTARY ACTUATOR

BACKGROUND OF THE INVENTION

Rotary actuators find widespread use in connection with fluid flow control valves of varying types for purposes of automating valve control or simplifying the control of inaccessible or remote valves. Since neither the rotary actuators nor the valves commonly employed in such circumstances are specifically designed for coupling with one another, a special bracketing system must be employed to join the valve and actuator bodies and couple the actuator output shaft with the valve stem or other valve actuating member. For the same reason, an inherent problem exists in obtaining and maintaining correct alignment between the actuator output member and the valve stem over the course of their coupled operation. As a result of this problem, conventional bracketing systems commonly provide a relatively extended separation between the valve and actuator for accommodating the misalignment thereof which may be expected to occur over the course of their coupled operation and thereby to minimize the effects of potentially destructive non-torsional reactive loads on the valve stem resulting from the valve actuation forces generated by the actuator. As will be recognized, such bracket arrangements do not solve the indicated problem but at best merely accommodate it. Further, the extended nature of such bracket arrangements significantly increases the space requirements for valve and actuator couplings.

SUMMARY OF THE INVENTION

It is accordingly an object of the present invention to provide an apparatus adapted for coupling a valve and actuator in close positive alignment with one another while protecting the valve stem or like actuating member from reactive loads generated by valve actuation forces. Another object of the present invention is to provide such a coupling apparatus which is substantially more compact than conventional coupling systems so as to reduce the overall space requirements for a coupled valve and actuator arrangement.

Briefly summarized, the coupling apparatus of the present invention is adapted for use with a valve of the type having a valve body with a gland arrangement rotatably supporting a valve stem for actuating opening and closing movement of the valve and a rotary actuator of the type having an actuator body rotatably supporting an output shaft. The present coupling apparatus includes a drive arrangement for establishing coaxial drive connection of the valve stem and the actuator output shaft for controlling the opening and closing movement of the valve. A bracket arrangement substantially rigidly connects the valve body and the actuator body. The bracket arrangement defines an opening which conforms to the gland arrangement for receiving the gland arrangement to apply reactive loads generated by valve actuation forces to the gland arrangement. In this manner, essentially only torsional actuation forces are applied to the valve stem.

In the preferred embodiment, the drive arrangement includes a nut affixed coaxially about the valve stem and a mating drive socket affixed to the actuator output shaft for coaxially receiving the nut in annular driving engagement therewith to establish positive coaxial drive connection therebetween. The bracket arrangement includes a plate assembly bolted respectively to each of the valve and actuator bodies and an annular alignment bushing, which defines the aforementioned opening of the bracket arrangement, supported by the plate assembly in annular fitted engagement about the valve gland arrangement. The present apparatus is particularly adapted for coupling a ball valve of the type wherein the gland arrangement includes a drive portion having a regular polygonal annular drive surface, in which case the opening defined by the annular alignment bushing is provided with a conforming regular polygonal shape.

DESCRIPTION OF THE PREFERRED EMBODIMENT

Figure 1:
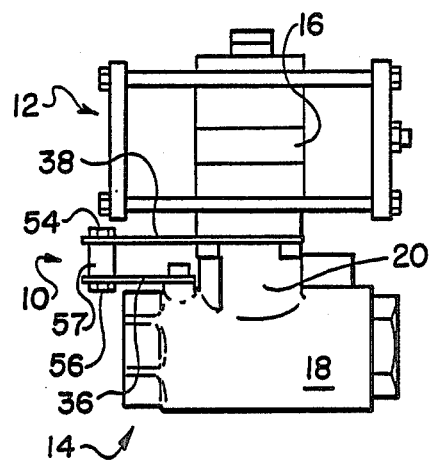
FIG. 1 is a side elevational view of a conventional rotary actuator and a conventional ball valve joined by a coupling apparatus according to the preferred embodiment of the present invention.
Figure 2:
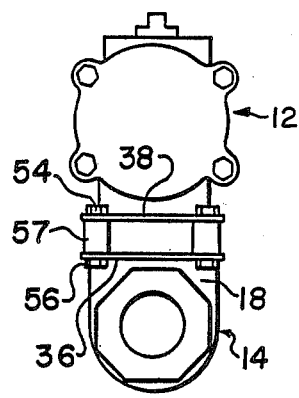
FIG. 2 is an end elevational view of the coupled ball valve and rotary actuator of FIG. 1.

Referring now to the accompanying drawings, the coupling apparatus of the present invention is shown generally at 10 in coupling relation with a conventional fluid-operated rotary actuator, indicated generally at 12, and a conventional rotary fluid control valve, indicated generally at 14.

The rotary actuator 12 as illustrated is exemplary of the CCA pneumatically-operated dual rack-and-pinion rotary one-quarter turn actuator manufactured and sold by Conbraco Industries, Inc., of Matthews, N.C., the assignee hereof. Since the construction and operation of such actuators is well known within the industry, a detailed description of the actuator 12 will not be set forth herein beyond that necessary to understand the present invention. As will be understood, the actuator 12 includes a main actuator body 16 within which a pinion gear (not shown) is rotatably disposed in respective meshing engagement with an opposed pair of slidable piston racks (also not shown). Pneumatic actuation of opposed movement of the piston racks toward and away from one another within the actuator body 16 synchronously produces reciprocal rotation of the pinion gear in opposite directions. At least one axial end of the pinion gear is exposed through the actuator body 16 and is provided with a female bore to facilitate driving connection of the pinion gear with a drive train or drive member to be reciprocably operated by the actuator 12.

The valve 14 is exemplary of a standard APOLLO brand two-piece body ball valve which is also manufactured and sold by Conbraco Industries, Inc. Hereagain, since the construction and operation of this ball valve is well known within the industry, a detailed description thereof is not set forth herein except insofar as necessary to facilitate an understanding of the present coupling apparatus. Basically, the valve 14 includes a tubular cast metal valve body 18 within which a valve ball (not shown) is rotatably contained between valve seat members for reciprocal valve opening and closing rotation to control fluid communication between the opposite tubular ends of the valve body 18. A tubular trunnion 20 projects outwardly from the central portion of the valve body 18 coaxial with the valve ball and threadedly receives a hexagonal gland screw 22 which rotatably supports a valve stem 24 in operative connection with the valve ball for actuating its opening and closing rotation. The exterior surface of the valve body 18 transversely alongside the trunnion 20 is formed with a substantially flat mounting pad 26 having a pair of threaded bores 28 formed at spacings therealong to facilitate mounting of the actuator 12.

Figure 3:
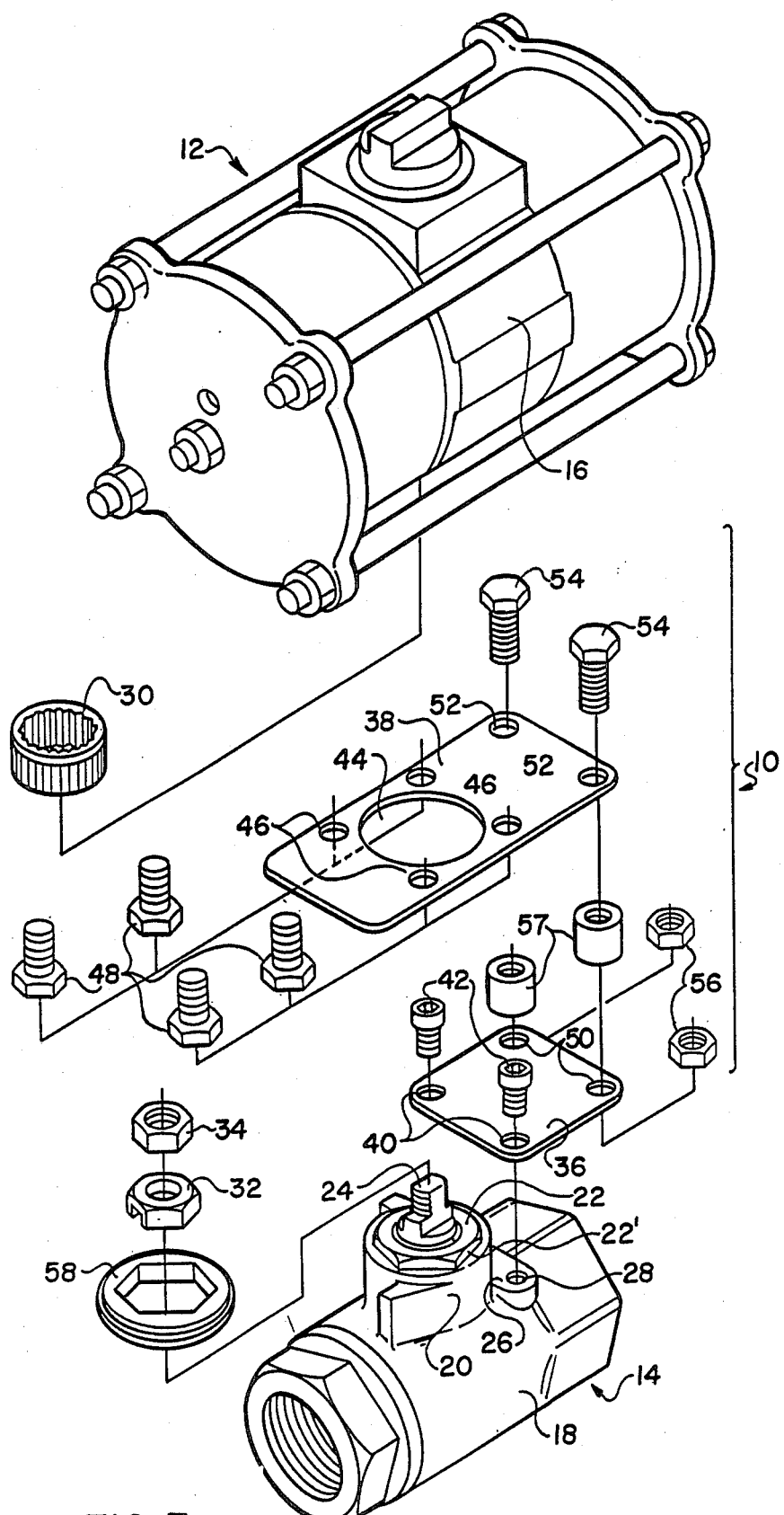
FIG. 3 is a perspective view illustrating the ball valve, rotary actuator and the present coupling apparatus in exploded relation.

The present coupling apparatus 10 will best be understood with reference to FIG. 3. Basically, the coupling apparatus 10 includes a drive arrangement for establishing a direct positive coaxial drive connection between the exposed output end of the actuator pinion gear and the valve stem 24 and a bracket arrangement for substantially rigidly connecting the valve body and the actuator body.

The drive arrangement includes an annular drive socket 30 adapted to be snugly press-fitted coaxially within the female bore in the axial output end of the actuator pinion. The interior of the drive socket 30 is annularly formed with a twelve-point double-hex broached surface configuration. A hexagonal valve stem adapter nut 32 having a slotted underside is provided to be fitted on the projecting exposed portion of the valve stem in conformity to the flattened sides thereof and a standard threaded retaining nut is provided to be threadedly engaged on the valve stem 24 to retain the adapter nut 32 in place. The hexagonal configuration of the adapter nut 32 is sized to fit axially within the drive socket 30 to couple the drive socket 30 and adapter nut 32 in rotational driving engagement.

The bracket arrangement includes a pair of bracket plates 36,38 with companion screws for rigid attachment respectively to the valve body 18 and the actuator body 12 and to one another. The bracket plate 36 is substantially square in configuration with a first pair of bores 40 formed therethrough along one side edge thereof at a spacing corresponding to the bores 28 in the valve body mounting pad 26 to facilitate affixation of the plate 36 by a pair of mounting screws 42. The bracket plate 38 is of a rectangular configuration having a central circular opening 44 therein with four bores 46 formed therethrough at equal spacings about the opening 44 to facilitate affixation of the plate 38 by screws 48 to the underside of the actuator body 16 with the opening 44 in coaxial relation to the actuator pinion. Each of the bracket plates 36,38 is also provided with another mating pair of bores 50,52, respectively, to facilitate affixation of the plates 36,38 to one another by bolts 54 and retaining nuts 56. Importantly, the mating bores 50,52 are respectively located in the bracket plates 36,38 to position the actuator pinion and the valve stem 24 in precise coaxial relation to one another. To compensate for the retaining heads of the respective mounting screws 42,48 by which the bracket plates 36,38 are respectively mounted to the valve and actuator bodies 18,16, interiorly threaded spacer sleeves 57 are threadedly engaged on the bolts 54 intermediate the plates 36 and 38. As will be understood, the coaxial mounting of the actuator pinion and the valve stem 24 also positions the circular opening 44 in the bracket plate 38 in coaxial relation to the valve stem 24 substantially co-planar with the hexagonal drive surface 22' of the valve gland screw 22. To maintain proper relative disposition between the bracket plates 36,38 and, in turn, between the actuator 12 and the ball valve 14, the bracket arrangement additionally includes an annular alignment bushing 58 having a stepped circular outer periphery adapted to fit snugly in the circular opening 44 in the bracket plate 38 and a hexagonal interior periphery for compatible fitted engagement annularly about the hexagonal drive surface 22' of the gland screw 22.

To install the coupling apparatus 10, the bracket plate 36, the adapter nut 32 and its retaining nut 34, and the alignment bushing 58 are initially mounted to the ball valve 14 as above-described. Similarly, the drive socket 30 and the bracket plate 38, after first preliminarily installing thereon the bolts 54 and spacer sleeves 58, are initially mounted to the actuator 12, with the mounting screws 48 being only hand tightened. With both the actuator 12 and the ball valve 14 manually actuated to their respective full open positions, the actuator 12 and the ball valve 14 are mounted to one another to position the valve stem adapter nut 32 within the drive socket 30, while at the same time positioning the outer periphery of the alignment bushing 58 in fitted engagement within the circular opening 44 in the bracket plate 38 and positioning the projecting ends of the bolts 54 through the bores 50 in the bracket plate 36. Assembly is completed by tightening the nuts 56 to the projecting ends of the bolts 54 adjacent the underside of the bracket plate 36. Thereupon, the tightening of the mounting screws 48 for the bracket plate 38 is completed.

As will thus be readily understood, the coupling apparatus 10 provides a positive and direct drive connection of the actuator 12 and the ball valve 14 compactly in close adjacency to one another. Importantly, in contrast to conventional bracket arrangements, the annular alignment bushing 58 of the bracket arrangement in the present coupling apparatus assures that all reaction loads generated by actuation forces resulting from the reciprocal actuation of the rotary actuator 12 are applied to the gland screw 22 rather than the valve stem 24, whereby essentially only torsional actuation forces are applied to the valve stem 24. Similarly, the alignment bushing 58 insures that common lateral loads and vertical down loads resulting from movement occurring in the pipeline to which the ball valve 14 is connected are also applied to and absorbed by the gland screw 22 and the valve body trunnion 20 rather than the valve stem or the various mounting screws of the coupling apparatus 10. As a result, the valve stem 24 is substantially isolated and insulated from such potentially damaging loads, thereby enhancing the reliability of performance of the coupled assembly of the actuator and valve.

While the present coupling apparatus has been illustrated and described herein in conjunction with specific examples of a conventional rotary actuator and a conventional valve, those persons skilled in the art will readily recognize that the applicability of the present coupling apparatus is not so limited but instead extends to a wide variety of varying actuator and valve constructions. By way of example, the present coupling apparatus may be readily adapted for use with substantially any one-quarter turn fluid or electrically-operated rotary actuator and substantially any conventional type of ball valve, as well as other types of rotary valves, providing some means by which the bracket arrangement may be affixed to the valve body and an alignment bushing may be fixed with respect to the valve body in coaxial relation to the rotary actuating member of the valve.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. Apparatus for coupling a valve of the type having a valve body with gland means rotatably supporting a valve stem for actuating opening and closing movement of said valve and a rotary actuator of the type having an actuator body rotatably supporting an output shaft, said coupling apparatus comprising drive means for establishing coaxial drive connection of said valve stem and said output shaft for controlling opening and closing movement of said valve and bracket means for substantially rigidly connecting said valve body and said actuator body, said bracket means defining an opening of a shape closely conforming annularly to said gland means for receiving said gland means to apply to said gland means reactive loads generated by valve actuation forces of said rotary actuator, whereby essentially only torsional actuation forces are applied to said valve stem.

2. Coupling apparatus according to claim 1 and characterized further in that said bracket means includes an alignment bushing defining said opening and being fitted annularly about said gland means.

3. Coupling apparatus according to claim 2 and characterized further in that said gland means includes a drive portion having a regular polygonal annular drive surface coaxially about said valve stem, said opening in said alignment bushing being of a conforming regular polygonal shape.

4. Coupling apparatus according to claim 3 and characterized further in that said bracket means includes plate means bolted to each of said valve body and said actuator body, said plate means supporting said alignment bushing in annular engagement with said drive surface of said gland means.

5. Coupling apparatus according to claim 1 and characterized further in that said drive means includes nut means affixed to said valve stem and mating drive socket means affixed to said output shaft for receiving said nut means in annular driving engagement therewith.

6. Apparatus for coupling a ball valve of the type having a valve body which rotatably supports a valve ball for reciprocal opening and closing rotation and gland means which rotatably supports a valve stem in operative connection to said valve ball for actuating movement thereof, said gland means including a drive portion having a regular polygonal annular drive surface, and a rotary actuator of the type having an actuator body rotatably supporting an output shaft for reciprocal driving rotation, said coupling apparatus comprising drive means for establishing positive coaxial drive connection of said valve stem and said output shaft for controlling opening and closing movement of said valve ball, said drive means including nut means affixed coaxially about said valve stem and mating drive socket means affixed to said output shaft for coaxially receiving said nut means in annular driving engagement therewith, and bracket means for substantially rigidly connecting said valve body and said actuator body, said bracket means including plate means bolted respectively to each of said valve body and said actuator body and an annular alignment bushing defining an axial opening of a regular polygonal shape closely conforming annularly to said drive surface of said gland means, said alignment bushing being supported by said plate means in annular fitted engagement about said drive surface of said gland means for applying to said gland means reactive loads generated by valve actuation forces of said rotary actuator, whereby essentially only torsional actuation forces are applied to said valve stem.

* * * * *